United States Patent
Marocchini et al.

(10) Patent No.: US 12,313,186 B2
(45) Date of Patent: May 27, 2025

(54) RINGLESS ZERO CLEARANCE CLOSURE

(71) Applicant: Hamilton Sundstrand Corporation, Charlotte, NC (US)

(72) Inventors: Francis P. Marocchini, Somers, CT (US); Robert DeFelice, South Windsor, CT (US); Lukasz Burek, Portland, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/509,706

(22) Filed: Nov. 15, 2023

(65) Prior Publication Data

US 2024/0084922 A1 Mar. 14, 2024

Related U.S. Application Data

(63) Continuation of application No. 17/384,591, filed on Jul. 23, 2021, now Pat. No. 11,835,154.

(51) Int. Cl.
| | |
|---|---|
| *F16K 41/04* | (2006.01) |
| *F16K 27/04* | (2006.01) |
| *F16K 41/16* | (2006.01) |
| *F16B 21/18* | (2006.01) |

(52) U.S. Cl.
CPC ............ *F16K 41/04* (2013.01); *F16K 27/041* (2013.01); *F16K 41/16* (2013.01); *F16B 21/18* (2013.01); *Y10T 137/6065* (2015.04)

(58) Field of Classification Search
CPC ........ F16K 41/04; F16K 27/12; F16K 27/041; F16K 27/047; F16K 27/04; Y10T 137/6607; Y10T 137/6011; Y10T 137/6065; Y10T 137/86574; Y10T 137/8667; F16B 21/18; F16B 21/09; F16B 3/04; F16B 3/06

See application file for complete search history.

(56) References Cited

U.S. PATENT DOCUMENTS

| | | | |
|---|---|---|---|
| 2,831,716 A | 4/1958 | Wurzel | |
| 4,343,581 A | 8/1982 | Millheiser | |
| 4,405,251 A | 9/1983 | Kolchinsky et al. | |
| 4,676,479 A * | 6/1987 | Ogawa ................. | F16K 5/0626 285/388 |
| 5,037,233 A | 8/1991 | Nishihara et al. | |
| 5,913,505 A | 6/1999 | Ouvrard et al. | |
| 6,814,098 B1 | 11/2004 | Marocchini | |

(Continued)

FOREIGN PATENT DOCUMENTS

DE 102016224884 A1 7/2017

OTHER PUBLICATIONS

First Communication Pursuant to Article 94(3) for European Patent No. 22186566.0, Dated Jun. 26, 2024, 5 Pages.

(Continued)

*Primary Examiner* — Craig M Schneider
*Assistant Examiner* — Andrew J Rost
(74) *Attorney, Agent, or Firm* — Kinney & Lange, P.A.

(57) ABSTRACT

A closure assembly including a retaining cover, a first catch plate sitting partially within the retaining cover, a second catch plate sitting partially within the retaining cover opposite the first catch plate and spaced apart from the first catch plate, and a closure pressing against the first catch plate and pressing against the second catch plate.

9 Claims, 3 Drawing Sheets

(56) References Cited

U.S. PATENT DOCUMENTS

| | | | |
|---|---|---|---|
| 8,944,408 B2 * | 2/2015 | Robison | F16K 1/38 |
| | | | 137/315.27 |
| 8,950,420 B2 | 2/2015 | Rickis | |
| 2016/0116075 A1 | 4/2016 | Pippel et al. | |
| 2019/0093782 A1 * | 3/2019 | Muehlhoff | C21D 1/06 |
| 2021/0062922 A1 | 3/2021 | Meloy et al. | |

OTHER PUBLICATIONS

Extended European Search Report for European Patent Application No. 22186566.0, dated Dec. 6, 2022.

* cited by examiner

RINGLESS ZERO CLEARANCE CLOSURE

CROSS-REFERENCE TO RELATED APPLICATIONS

This is a continuation of U.S. patent application Ser. No. 17/384,591 filed Jul. 23, 2021 the content of which is incorporated by reference herein in its entirety.

BACKGROUND

Technological Field

The present disclosure relates generally to a closure retention method and specifically to an improved retention feature for a wedge style retention closure typically referred to as C-Ring and zero clearance closures.

Description of Related Art

Pressurized cavities, such as valves, typically employ C-Rings and other zero clearance closures for their high load capability, small packaging, and no requirement for secondary retention methods. However, the C-rings and peripheral hardware require machining to tight tolerances and are thus expensive and timely to produce. While these conventional retention methods have generally been considered satisfactory for their intended purpose, there is a clear need for improved methods that are both more efficient and less expensive to produce. The present disclosure provides a solution for this need.

SUMMARY OF THE INVENTION

A new closure assembly is disclosed. The closure assembly includes a retaining cover, a first catch plate sitting partially within the retaining cover, a second catch plate sitting partially within the retaining cover opposite the first catch plate, and a closure pressing against the first catch plate and pressing against the second catch plate. The first and second catch plates will be in contact with the valve bore when the hydraulic valve is loaded outward. The closure can be seated within a hydraulic valve. The first catch plate does not contact the second catch plate. The retention plate can include a through hole to receive a shaft of the closure. A locking feature, such as locknut can be employed to retain the closure assembly.

Each catch plate can include a first axial facing side to face an outer portion of the valve and press against an axially inward facing side of the closure, an outward radially facing side to connect the first axial facing side to a second axial facing side wherein the second axial facing side is configured to face an in portion of the valve and press against an outwardly facing side of a closure, and an inward facing side connected to the first axial facing side and to the second axial facing side pressed against a radially pointed face of the retention plate. The outward radially facing side can be curved from the first axial facing side to the second axial facing side. The outward radially facing side can be convex from a first edge to a second edge. The outward radially facing side can further define an arch, wherein the arch can extends from a first side chamfer to a second side chamfer.

The outward radially facing side can be connected to the inward facing side by a first side chamfer and a second side chamfer. The first axial facing side can form a 90 degree angle with the inward facing side. A distance between the first axial facing side and the second axial facing side can be larger than a length of the inward facing side along a longitudinal axis. The outward radially facing side can arched spanning between 160 and 170 degrees between a first side chamfer and a second side chamfer.

It is also considered that with a valve assembly each catch plate is in contact with the inner surface of the bore and an outward radially facing side of each catch plate is in contact with a surface of a widening section of the bore. A radial gap can be defined by the retention plate the catch plate. The radial gap can define a triangular cross-section. The valve assembly can include a locking means coupled to the closure for locking the closure assembly.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 3a is a back perspective view of an exemplary embodiment of the catch plate of FIG. 1a; and FIG. 3b is a front perspective view of the catch plate of FIG. 3a.

DETAILED DESCRIPTION

Figure 1A:
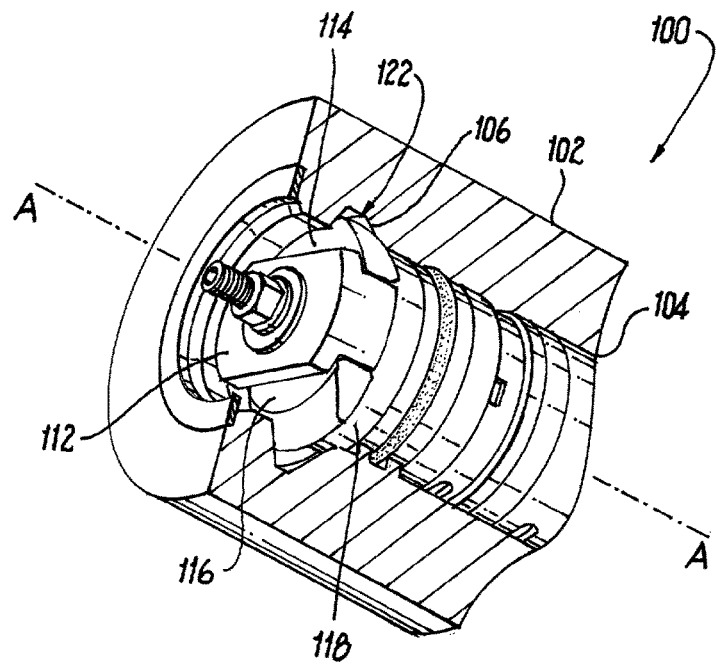
FIG. 1a is a cross-sectional perspective view of an exemplary embodiment of a valve, showing a retention assembly for retaining components internal to the valve.
Figure 1B:
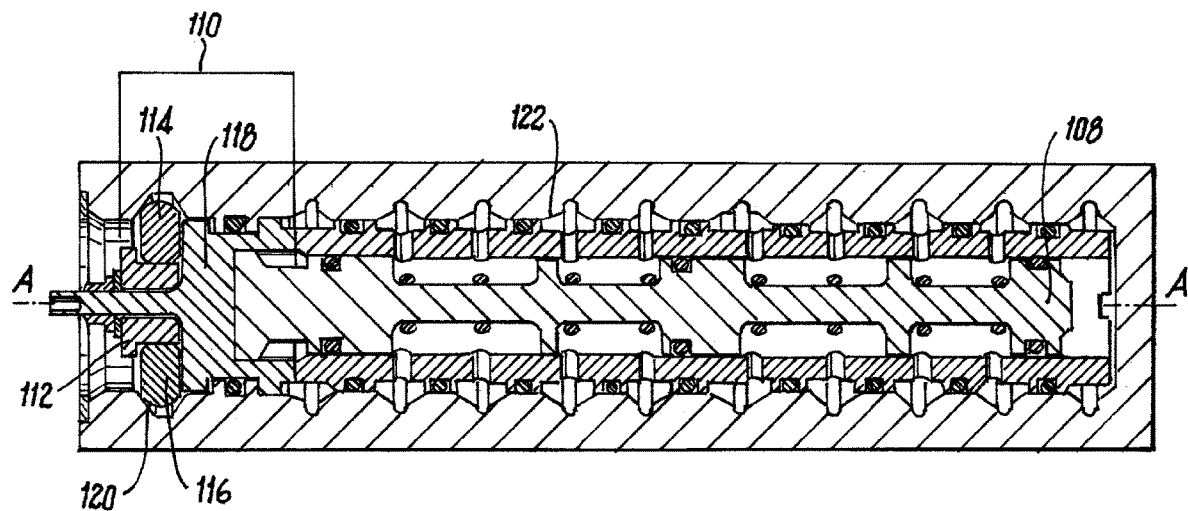
FIG. 1b is a sectional side view of the exemplary embodiment of the valve of FIG. 1a, showing a side arrangement of the retention assembly.
Figure 1C:
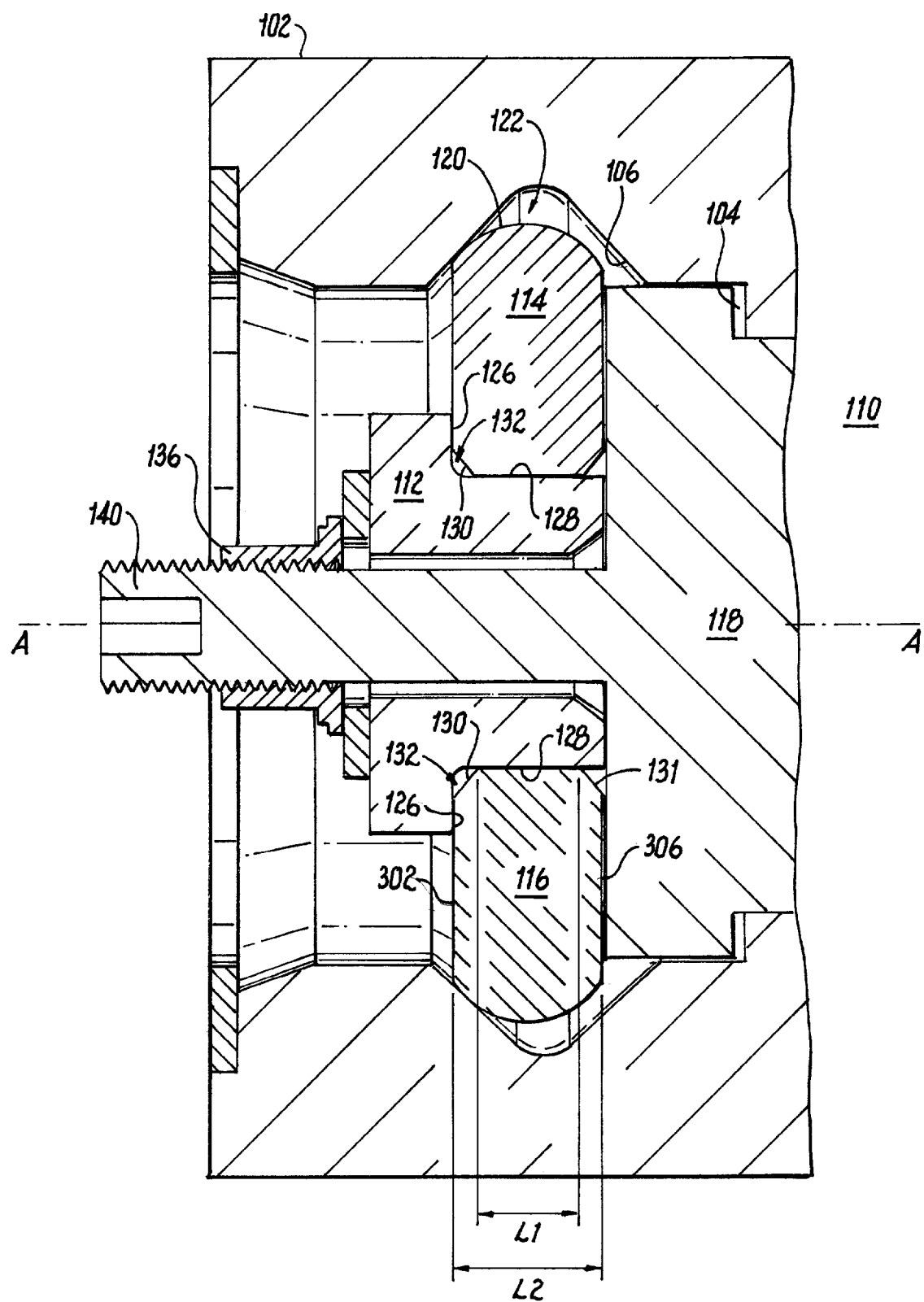
FIG. 1c is an enlarged sectional side view of FIG. 1b, showing details of the retention assembly.

Reference will now be made to the drawings wherein like reference numerals identify similar structural features or aspects of the subject disclosure. For purposes of explanation and illustration, and not limitation, a partial view of an exemplary embodiment of a valve in accordance with the disclosure is shown in FIGS. 1a-1c and is designated generally by reference character 100. Other embodiments of the valve and shaft retention methods, are provided in FIGS. 2-3b, as will be described. The methods and systems of the present disclosure, as described above and shown in the drawings, provide for a ring-less closure with zero clearance.

Referring now to FIGS. 1a-1c, a valve assembly 100 is shown. The present valve is a hydraulic valve, but one of ordinary skill in the art will appreciate that embodiments of the disclosure can be used and applied to other types of valves. The valve 100 includes a housing 102 with an inner bore 104. The bore 104 has an inner surface 106 that includes a plurality of undulations and ridges 122. The valve 100 includes a valve shaft 108 that actuates back and forth along a longitudinal axis A. A closure assembly 110 is used to keep internal components within the bore 104.

Figure 2:
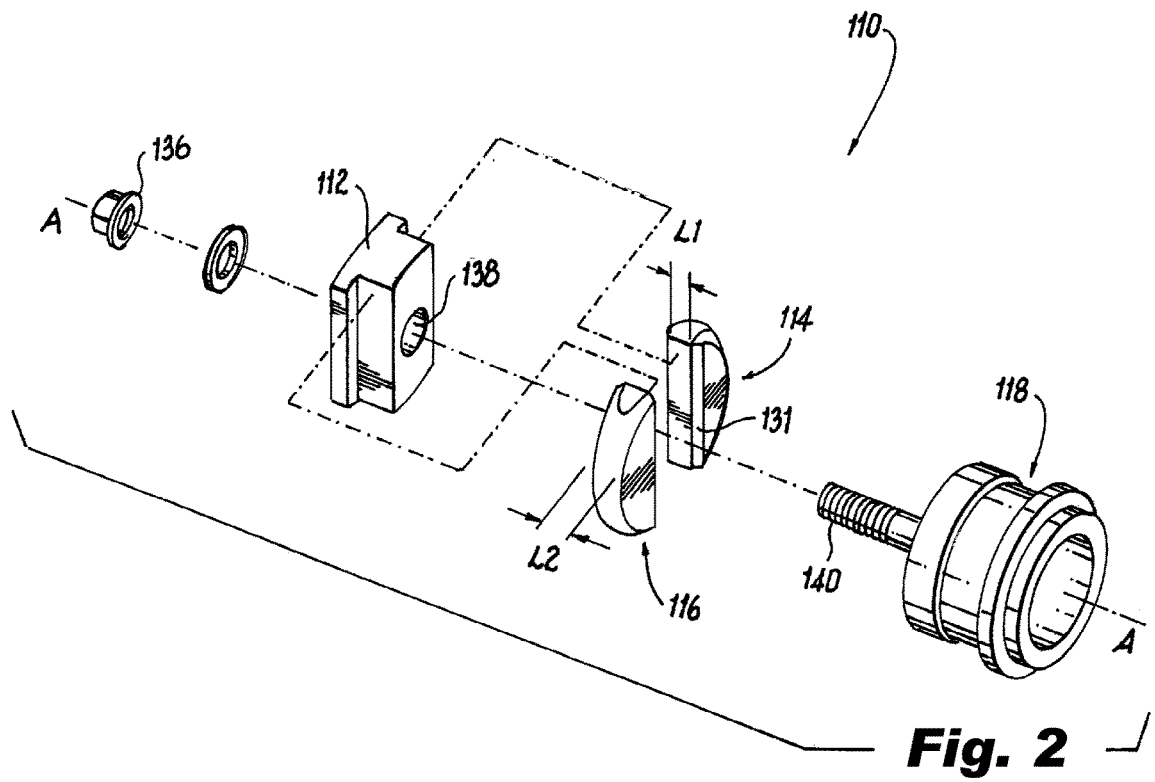
FIG. 2 is an exploded perspective view of an exemplary embodiment of the retention assembly of FIG. 1a, showing the retention assembly parts separately.

Referring now to FIG. 2, an exploded view of the closure assembly 110 shows a retention plate 112, a first catch plate 114 that sits partially within the retaining cover 112, and a second catch plate 116 that sits partially within the retaining cover 112 opposite the first catch plate 114. A closure 118 presses against the first and second catch plates 114, 116 opposite the retaining cover 112. A locknut 136 is used to retain the assembly 110. The locknut 136 is threaded onto a shaft 140 of the closure 118 that protrudes though an aperture 138 of the retention plate 112.

Referring again the FIGS. 1a-1c, each catch plate 114/116 is in contact with the inner surface 106 of the bore 104. Specifically, an outward radially facing side 120 of each catch plate is in contact with a surface of a widening section or undulation 122 of the bore. The V-groove or undulation 122 within the inner surface 106 of the valve 100 is a sharp-V groove. V-grooves and sharp angles are typically easier to machine versus configurations that require rounded edges. The V-groove also allows for tolerances within the valve 100 to be more relaxed. The meeting of the undulation 122 and the outward radially facing side 120 of the catch plates 114/116 helps retain the closure assembly and all other internal components. The free-form meeting of undulation 122 and each outward radially facing side 120 of each catch plate 114/116 allows the catch plates 114/116 to center the load within the shaft 108 and to self-adjust and center within the undulation 122 without a need for precision installation. Further, a triangular gap 132 is defined by an radially extending surface 126 (relative to the longitudinal axis A) of the retention plate 112 and a longitudinal surface 128, extending along the longitudinal axis A of the retention plate 112, and a front chamfer 130 of the catch plate 114/116. The gaps 132, extending in radial directions have cross-sections that is triangular. This provides enough clearance with the retention plate 112 to facilitate insertion and placement of the retention the catch plates 114/116 behind retention plate 112.

Figure 3A:
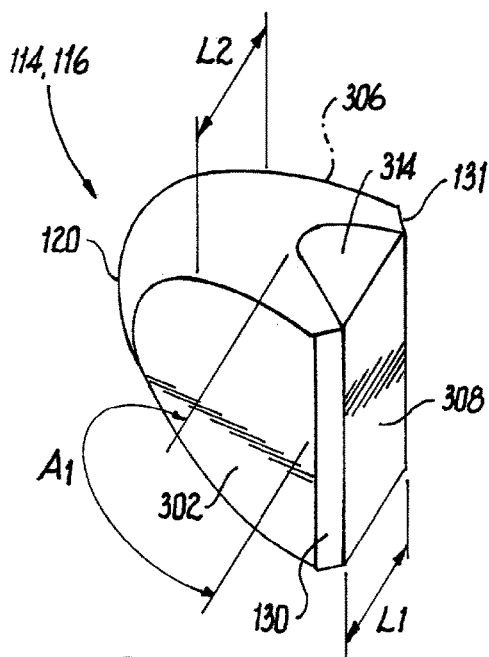
Figure 3B:
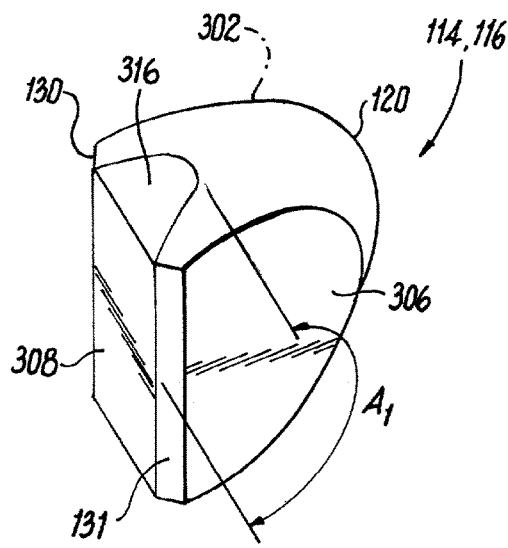

Referring to FIGS. 3a and 3b, a detailed view of one of the catch plates 114/116 is shown. The catch plate 114/116 is defined by a first axial facing 302 to face the outside of the valve 100 and retained within the inner side of the retention plate 112 of FIG. 1, an first outer side 120 connecting the first axial facing side 302 to a second axial facing side 306. The second axial facing side 306 is meant to face the inside of the valve 100 and press against an axially outside facing side of the closure 118. An inward facing side 308 is narrower than the outward radially facing side 120, and is connected to the first axial facing side 302 and to the second axial facing side 306 by the front chamfer 130 and a rear chamfer 131. In other words, the inner side 308 extends relative to the longitudinal axis along a length (L1), wherein L1 is shorter than the distance between the first axial facing side 302 and the second axial facing side 306 (L2).

Referring further to FIGS. 3a and 3b, the outward radially facing side 120 of each of the catch plates 114/116 is curved in an axial direction defining a convex arch from the first axial facing side 302 to the second axial facing side 306. The outward radially facing side 120 is also round along the axial facing sides 302/306 between, the curve angle (A1) spanning between approximately 160 and 170 degrees. The outward radially facing side 120 joins a first side chamfer 314 and a second side chamfer 316. Each of the chamfers can be between 30 and 60 degrees with respect to the axial direction, but are preferred to be 45 degrees.

The methods and systems of the present disclosure, as described above and shown in the drawings, provide for a ring less closure with zero clearance which has similar benefits as that of a C-ring style closures but is additionally simpler to manufacture. Additionally, the closure also provides improved centering equal distribution of load. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A catch plate assembly comprising:
a first catch plate and a second catch plate spaced apart from the first catch plate, each catch plate having,
a first axial facing side to face an outer portion of a valve;
an outward radially facing side connecting the first axial facing side to a second axial facing side wherein the second axial facing side is configured to face an inner portion of the valve; and
an inward facing side connected to the first axial facing side and to the second axial facing side by a front chamfer and a rear chamfer respectively, wherein the outward radially facing side is curved in an axial direction defining a convex lens shape, wherein the inward facing side is narrower than the outward radially facing side,
wherein each of the first axial facing sides are configured to face the outer portion of the valve and configured to press against an axially inward facing side of a retention plate and wherein each of the second axial facing sides are configured to face the inner portion of the valve and configured to press against an outwardly facing side of a closure, and wherein the inward facing sides are spaced apart from and face each other.

2. The assembly of claim 1, wherein the outward radially facing side is curved from the first axial facing side to the second axial facing side.

3. The assembly of claim 2, wherein the outward radially facing side is convex from a first edge to a second edge.

4. The assembly of claim 1, wherein the outward radially facing side defines an arch.

5. The assembly of claim 4, wherein the arch extends from a first side chamfer to a second side chamfer.

6. The assembly of claim 1, wherein the outward radially facing side is connected to the inward facing side by a first side chamfer and a second side chamfer.

7. The assembly of claim 1, wherein the first axial facing side forms a 90 degree angle with the inward facing side.

8. The assembly of claim 1, wherein a distance between the first axial facing side and the second axial facing side is larger than a length of the inward facing side along a longitudinal axis.

9. The assembly of claim 1, wherein the outward radially facing side is arched spanning between 160 and 170 degrees from a first side chamfer to a second side chamfer.

* * * * *